(12) United States Patent
Marcé et al.

(10) Patent No.: US 11,727,325 B2
(45) Date of Patent: Aug. 15, 2023

(54) USER INTERFACE TO ANALYZE AND NAVIGATE THROUGH DECISION LOGIC

(71) Applicant: FAIR ISAAC CORPORATION, Roseville, MN (US)

(72) Inventors: Jean-Luc M. Marcé, Sunnyvale, CA (US); Balachandar Rangarajulu Sriramulu, Bangalore (IN); Imran Ali, Bangalore (IN); Qiao Chen, Mountain View, CA (US)

(73) Assignee: Fair Isaac Corporation, Roseville, MN (US)

( * ) Notice: Subject to any disclaimer, the term of this patent is extended or adjusted under 35 U.S.C. 154(b) by 1199 days.

(21) Appl. No.: 16/052,453

(22) Filed: Aug. 1, 2018

(65) Prior Publication Data

US 2020/0042887 A1    Feb. 6, 2020

(51) Int. Cl.
| | | |
|---|---|---|
| *G06F 16/907* | (2019.01) | |
| *G06Q 10/0631* | (2023.01) | |
| *G06F 3/0484* | (2022.01) | |
| *G06N 5/045* | (2023.01) | |
| *G06F 16/901* | (2019.01) | |
| *G06F 18/243* | (2023.01) | |
| *G06N 5/01* | (2023.01) | |

(52) U.S. Cl.
CPC ....... *G06Q 10/0631* (2013.01); *G06F 3/0484* (2013.01); *G06F 16/9027* (2019.01); *G06F 18/24323* (2023.01); *G06N 5/01* (2023.01); *G06N 5/045* (2013.01)

(58) Field of Classification Search
CPC .... G06N 5/045; G06N 5/003; G06F 16/9027; G06F 3/0484; G06K 9/6282
USPC ....................................................... 707/601
See application file for complete search history.

(56) References Cited

U.S. PATENT DOCUMENTS

| | | | | |
|---|---|---|---|---|
| 7,324,931 B1* | 1/2008 | Warlock | .............. | G06F 30/3323 703/20 |
| 9,043,761 B2* | 5/2015 | Artzi | ................... | G06F 11/3688 717/124 |
| 9,098,291 B1* | 8/2015 | Lin | ........................... | G06F 8/10 |
| 9,354,776 B1* | 5/2016 | Subramanian | ........ | G06F 3/0486 |
| 10,761,513 B2* | 9/2020 | Oya | ..................... | G05B 19/418 |
| 2002/0046397 A1* | 4/2002 | Schmitt | ............... | G05B 19/056 717/125 |
| 2004/0205702 A1* | 10/2004 | Logan, III | .......... | G06F 11/3696 717/109 |

(Continued)

OTHER PUBLICATIONS

Charntaweekhun et al., "Visual Programming using Flowchart," 2006 International Symposium on Communications and Information Technologies, 2006, pp. 1062-1065, doi: 10.1109/ISCIT.2006. 339940. (Year: 2006).*

*Primary Examiner* — Hosain T Alam
*Assistant Examiner* — Robert F May
(74) *Attorney, Agent, or Firm* — Mintz Levin Cohn Ferris Glovsky and Popeo, P.C.

(57) ABSTRACT

Systems, methods, and techniques to efficiently analyze and navigate through decision logic using an execution graph are provided. The method includes executing decision logic in response to receiving a data file. The method further includes generating, in response to the executing, an execution graph. The execution graph includes a plurality of nodes corresponding to a plurality of decision entities of the decision logic. The method further includes displaying the execution graph on a user interface. The method further includes displaying, in response to receiving a selection of a node of the plurality of nodes, information associated with the selected node.

20 Claims, 6 Drawing Sheets

(56) References Cited

U.S. PATENT DOCUMENTS

| | | | | |
|---|---|---|---|---|
| 2005/0268173 | A1* | 12/2005 | Kudukoli | G06F 11/3604 |
| | | | | 714/38.1 |
| 2005/0268288 | A1* | 12/2005 | Nattinger | G06F 8/34 |
| | | | | 717/125 |
| 2007/0283352 | A1* | 12/2007 | Degenhardt | G06Q 10/06 |
| | | | | 718/100 |
| 2009/0064053 | A1* | 3/2009 | Crawford | G06F 3/04845 |
| | | | | 715/854 |
| 2010/0257506 | A1* | 10/2010 | Clark | G06F 30/20 |
| | | | | 717/105 |
| 2012/0029661 | A1* | 2/2012 | Jones | G06F 3/0484 |
| | | | | 700/17 |
| 2012/0124504 | A1* | 5/2012 | Maybee | G06F 11/3636 |
| | | | | 715/772 |
| 2013/0116986 | A1* | 5/2013 | Zhang | G06F 30/20 |
| | | | | 703/2 |
| 2013/0117280 | A1* | 5/2013 | Donaldson | G06F 16/17 |
| | | | | 707/754 |
| 2013/0205280 | A1* | 8/2013 | Bragdon | G06F 11/3664 |
| | | | | 717/125 |
| 2014/0059518 | A1* | 2/2014 | Sierk | G06F 30/34 |
| | | | | 717/127 |
| 2014/0245065 | A1* | 8/2014 | Weiner | G06F 11/3636 |
| | | | | 714/37 |
| 2015/0324275 | A1* | 11/2015 | Luan | G06F 11/3692 |
| | | | | 717/124 |
| 2019/0325093 | A1* | 10/2019 | Schreder | G05B 19/41885 |
| 2019/0369849 | A1* | 12/2019 | Gonzalez | G06T 1/20 |
| 2020/0012265 | A1* | 1/2020 | Thomsen | G06F 3/0481 |

* cited by examiner

USER INTERFACE TO ANALYZE AND NAVIGATE THROUGH DECISION LOGIC

TECHNICAL FIELD

The subject matter described herein relates to analysis of data processing, and more particularly, efficient analysis of decision logic.

BACKGROUND

Decision management systems leverage massive amounts of data to deliver insight into different behavior and propensities, which enables systems to render more precise decisions or relevant offers. After an analytic model has been developed, it may be operationalized by integration into automated decision-making systems and processes. The analytics may be translated into a rule language or decision which offers the additional value of being able to execute and deploy the models in other environments.

SUMMARY

This document presents systems, methods, and techniques to analyze and navigate decision logic using an execution graph.

In one aspect, a computer implemented method is provided. The method includes executing decision logic in response to receiving a data file. The method further includes generating, in response to the executing, an execution graph. The execution graph may include a plurality of nodes corresponding to a plurality of decision entities of the decision logic. The method further includes displaying the execution graph on a user interface. The method further includes displaying, in response to receiving a selection of a node of the plurality of nodes, information associated with the selected node.

In another aspect, a non-transitory computer program product storing instructions that, when executed by at least one programmable processor, cause at least one programmable processor to perform operations is provided. The operations include executing decision logic in response to receiving a data file. The operations further include generating, in response to the executing, an execution graph. The execution graph may include a plurality of nodes corresponding to a plurality of decision entities of the decision logic. The operations further include displaying the execution graph on a user interface. The operations further include displaying, in response to receiving a selection of a node of the plurality of nodes, information associated with the selected node.

In another aspect a system is provided. The system includes at least one programmable processor. The system further includes a machine-readable medium storing instructions that, when executed by the at least one processor, cause the at least one programmable processor to perform operations. The operations include executing decision logic in response to receiving a data file. The operations further include generating, in response to the executing, an execution graph. The execution graph may include a plurality of nodes corresponding to a plurality of decision entities of the decision logic. The operations further include displaying the execution graph on a user interface. The operations further include displaying, in response to receiving a selection of a node of the plurality of nodes, information associated with the selected node.

In some variations one or more of the following may optionally be included. The decision entity may be a decision table, a decision tree, a ruleset, and/or a scorecard. The information associated with the selected node may include a variable reference, a logical condition, a variable value, a variable threshold, and/or an output associated with the selected node. The method and/or operations may further include displaying, via the user interface, a variable and a corresponding variable value changed by the decision logic. The method and/or operations may further include displaying, via the user interface and in response to receiving a selection of the variable value, an indication of a highlighted node of the plurality of nodes associated with the selected variable value. The method and/or operations may further include displaying, via the user interface and in response to receiving a selection of the variable value, information associated with the highlighted node. The execution graph may display the plurality of nodes in an order of execution. The plurality of nodes may include a rule node, the rule node corresponding to a rule of the decision logic. The execution graph may further include a group node comprising one or more rule nodes. The user interface may include a playback control, the playback control may include a forward direction and a reverse direction for navigating the plurality of nodes in an order of execution or in a reverse order of execution. The playback control may include an auto-play mode, the auto-play mode automatically selecting each node of the plurality of nodes in the order of execution. The method and/or operations may further include displaying, in response to the automatic selecting in the auto-play mode, each rule associated with a currently selected node of the plurality of nodes.

Implementations of the current subject matter may include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which may include a computer-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a rule management system or other software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter is directed to an enhanced visualization of an execution path in a decision system and may make it possible to freely navigate in forward or backward direction to view details about decision entities (decision tables, decision trees, rulesets, scorecards, etc.) executed by the decision management system for a particular decision and to understand the decision logic flow. Prior systems for analyzing and navigating decision logic involved static rule reports or logs of all executed rules; embedding some explanation of the decisions within the decision results, typically in the form of "reason codes" or other such codes; and IDE-based debuggers that can control the decision management system and step through its execution in an interactive fashion. Under these prior systems it was not possible to obtain a visual logical view of the overall decision logic used in making a particular decision. Accordingly, a user would not be able to freely navigate forward or backward through the decision logic and underlying rules to better understand the conditions, flow and actions of decision logic and its incremental impact on variables, such as business variables. Additionally, it was not possible to navigate in a reverse direction from affected variables to the decision entities and rules that were responsible for the changes to those variables.

Rules, rulesets, and ruleset metaphors are forms of processing logic commonly used in a Business Rule Management System (BRMS). A rule expresses logic in the form of a set of conditions evaluated on some input, paired with a set of actions executed if the rule conditions evaluate to true. Rules are typically grouped in a structure called a ruleset. A function takes parameters, executes a series of statements and returns a value. Decision metaphors/entities can take various forms, including decision tables, decision trees, decision graphs, scorecards, and/or the like. Each of these forms provides a different way to express a set of rules in a way that best matches the natural representation for a given use case. At runtime, there are multiple, common techniques for executing decision logic using either a special rule engine or a code generation technique.

Figure 1:
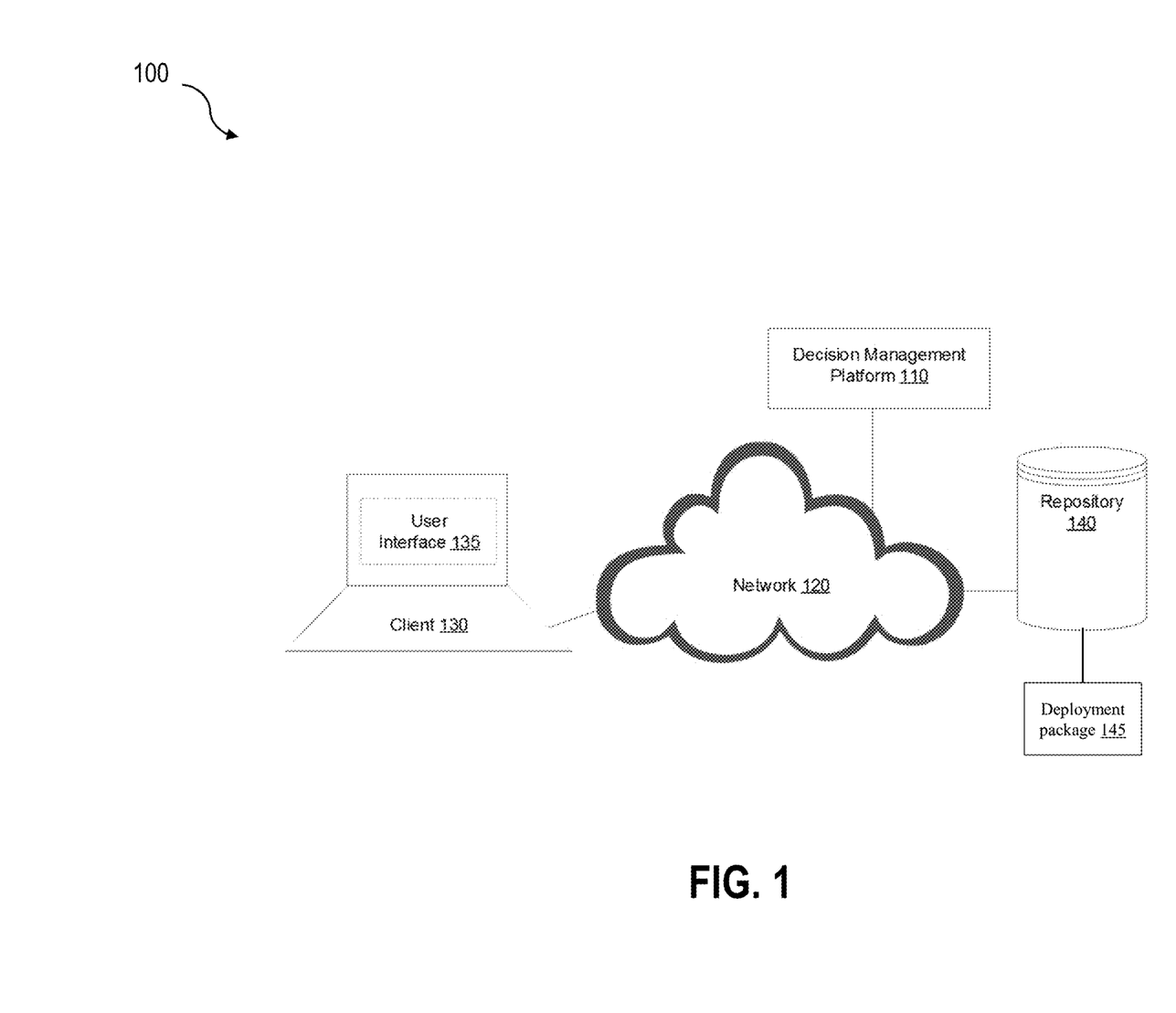
FIG. 1 depicts a system diagram illustrating a decision management system, in accordance with some example implementations.

FIG. 1 depicts a system diagram illustrating a decision management system 100, in accordance with some example implementations. Referring to FIG. 1, the decision management system 100 may include a decision management platform 110. In some implementations of the current subject matter, the decision management platform 110 may be a Platform-as-a-Service (PaaS) that is deployable in a public and/or a public cloud setting. The decision management platform 110 may also be a server or other computing apparatus configured to organize and process complex rule logic. In some aspects, the decision management platform 110 may include a rules engine that executes one or more rules at runtime. As shown in FIG. 1, the decision management platform 110 may be communicatively coupled, via a wired and/or wireless network 120, with a client 130 and a repository 140. A deployment package 145 may be generated from decision entities and/or decision logic stored in the repository 140. Alternatively, the deployment package 145 may be stored in a separate storage. The client 120 may be a device that includes at least one processor and at least one memory including program code such as, for example, a computer, a tablet, a mobile device, a smart phone, and/or the like. The network 120 may be the Internet, a public land mobile network, a wireless local area network (WLAN), a wide area network (WAN), a point-to-point link, and/or the like.

The decision management platform 110 can further store decision logic that is executed by the rules engine to a location within the repository 140 or other storage location. The rules engine may retrieve the decision logic from the repository 140 or other storage location, compile the decision logic into a deployment package (e.g., deployment package 145), and execute the deployment package when testing the decision logic. Alternatively, the rules engine may compile and run the decision logic directly from the repository 140 without creating the deployment package. In another implementation, the deployment package may be deployed to a separate logic execution system, such as when the decision logic is deployed to a production system.

The subject matter described herein provides a new interactive method for exploring the decision entities involved in a particular decision and analyzing how that decision was reached. Using this method, the system collects events occurred during a decision process and constructs an execution graph having details of decision logic employed to arrive at a particular decision.

Figure 2:
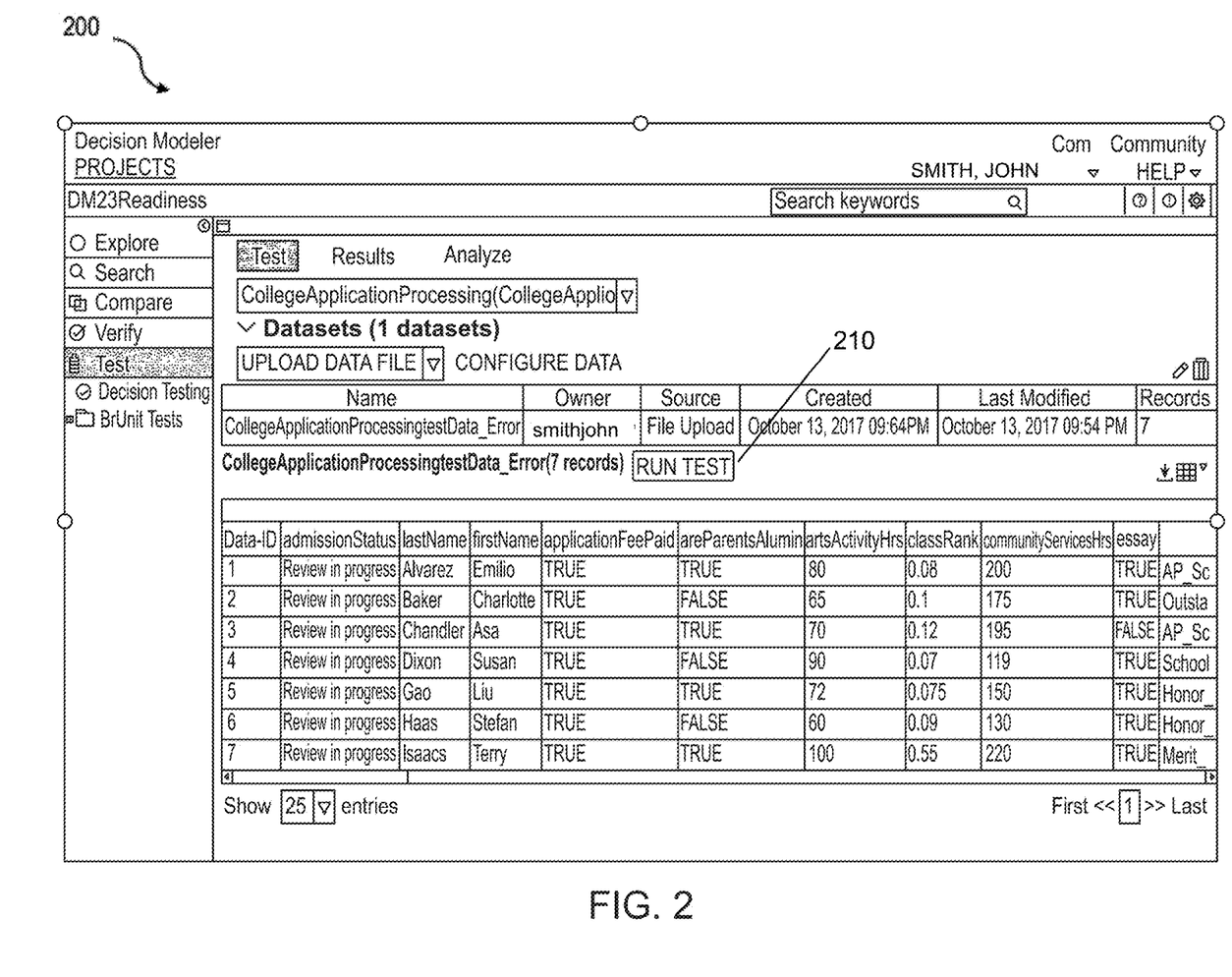
FIG. 2 depicts a user interface for selecting a data file for testing, in accordance with some example implementations.

FIG. 2 depicts an example of a user interface 200 for selecting a data file for testing, in accordance with some example implementations. As shown in FIG. 2, the user interface 200 has received a selection of a data file for testing. The selected data file of user interface 200 includes seven input records (Data-ID 1-7, as shown) storing records/information. In the example of FIG. 2, each input record corresponds to a student application record. The input records may be stored in one or more tables, spreadsheets, databases, vectors, and/or the like. After the data file is loaded, the decision management platform 110 may execute decision logic, such as decision logic stored in the repository 140, on the selected data file. As shown in FIG. 2, the decision logic may be executed by selecting the button 210 ("Run Test" button).

Figure 3:
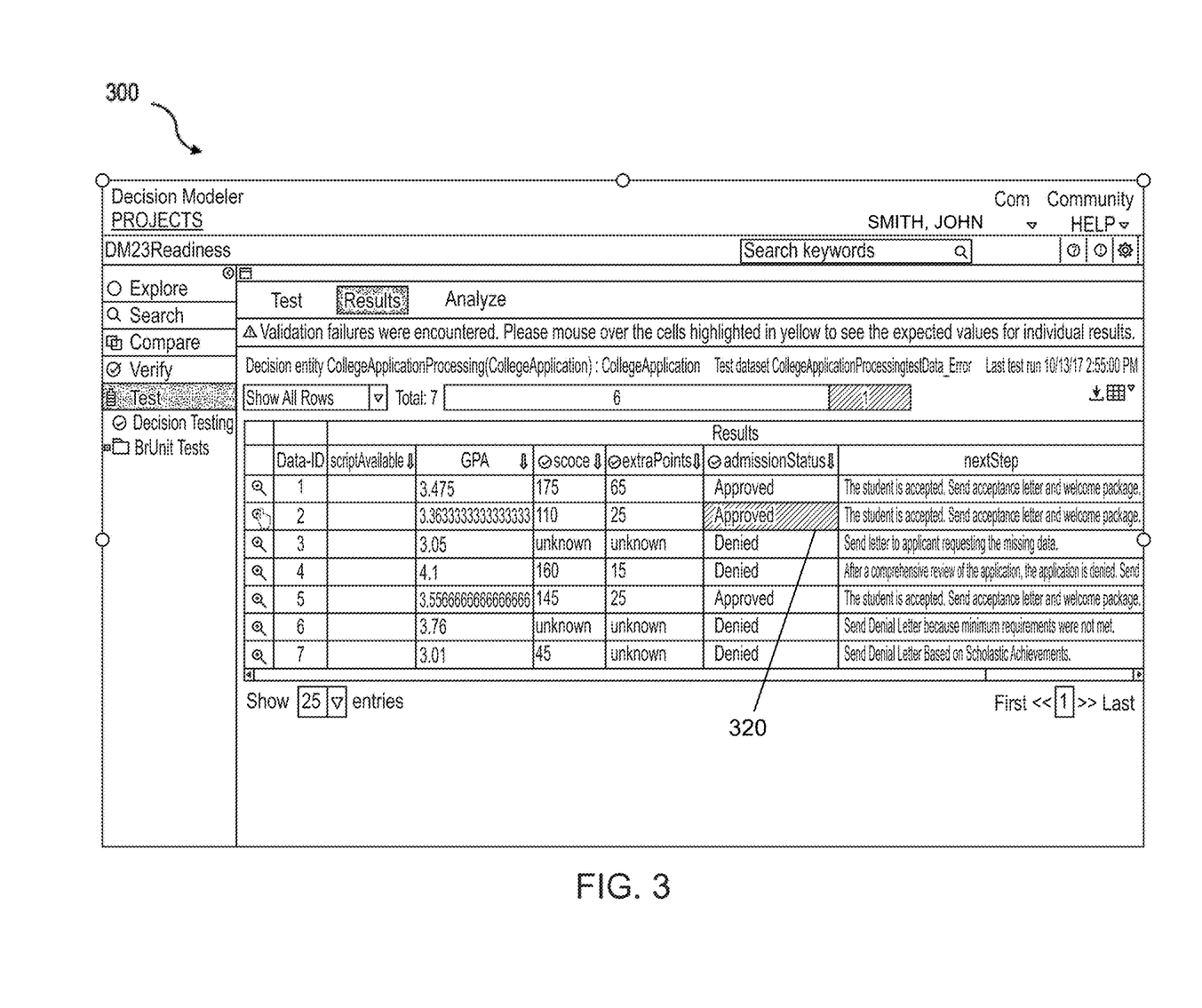
FIG. 3 depicts a user interface for reviewing an executed data file and selecting an executed input record for analysis, in accordance with some example implementations.

FIG. 3 depicts another example of a user interface 300 for reviewing an executed data file and selecting an executed input record for analysis, in accordance with some example implementations. The user interface 300 depicts an example output file resulting from executing the decision logic. The output file may include decisions and results for variable values after the decision logic has been applied to the input records of the selected data file of FIG. 2. As shown, in FIG. 3, the admissionStatus variable value 320 of input record Data-ID 2 is highlighted. The highlighting indicates that an error occurred for this input record during execution of the decision logic.

Figure 4:
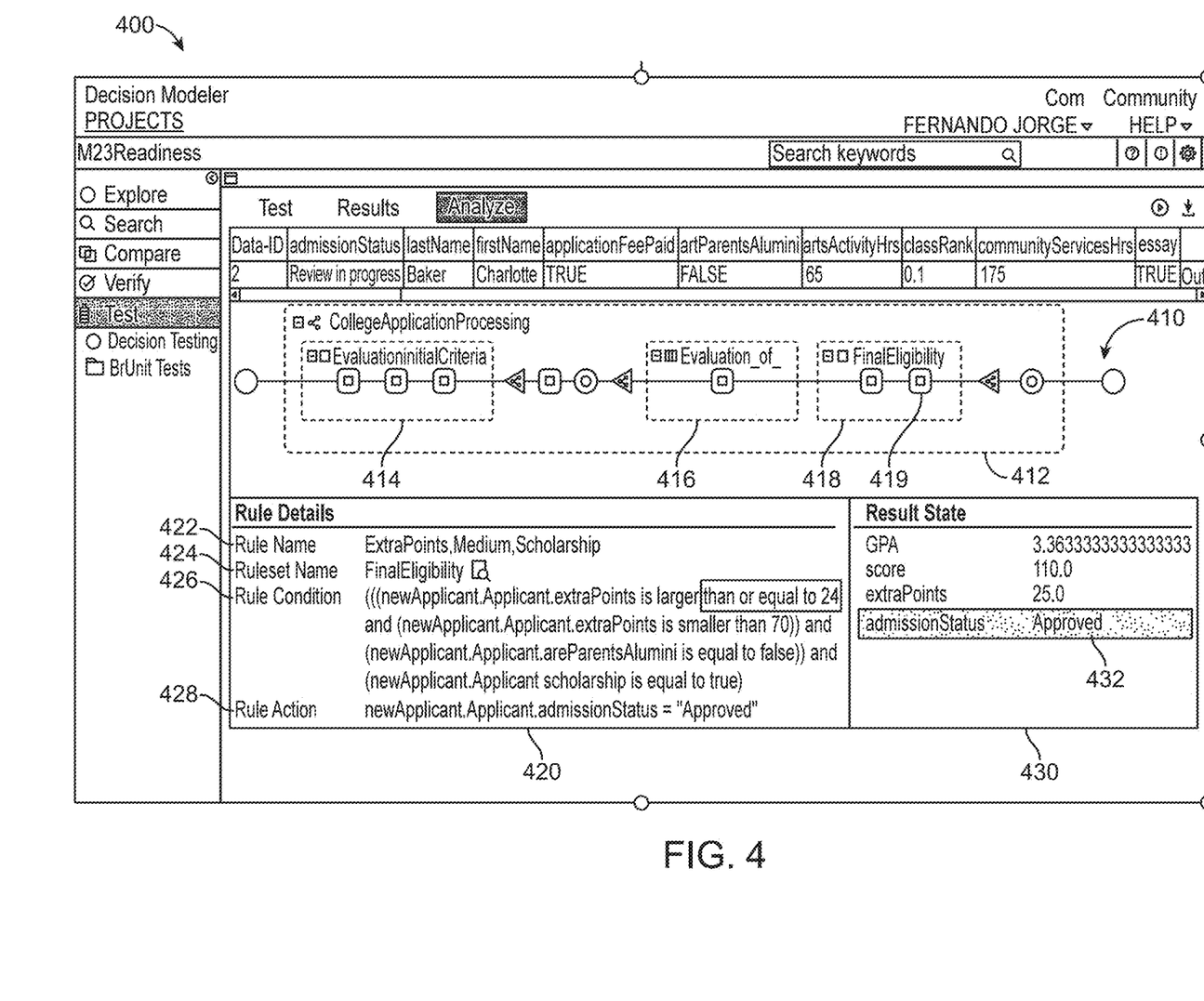
FIG. 4 depicts another user interface for analyzing and navigating decision logic, in accordance with some example implementations.

FIG. 4 depicts another example of a user interface 400 for analyzing decision logic, in accordance with some example implementations. In some aspects, the user interface 400 may be generated in response to selecting the input record Data-ID 2 of user interface 300. As shown in FIG. 4, the user interface 400 includes an execution graph 410, a rule details portion 420, and a result state portion 430.

The user interface 400 may be generated in response to executing an input record or file from a rule project, database, and/or the like. The input record may include record specific data to be executed by a rules engine. For example, the input record may include a single college application file from a plurality of college applications. The rules engine may execute defined rules that may determine values or results from the input record. In some aspects, the decision management platform 110 may monitor and store the inputs and outputs of the rules executed and generate the execution graph 410 in a portion of the user interface 400 based on those inputs and outputs. An application programming interface (API) of the decision management platform 110 may be configured to monitor the rules engine for the occurrence of certain events and results (e.g., calls of a functions, evaluation of rules, decisions made, changes to values, etc.) at runtime. The decision management platform 110 may then generate the execution graph 410 from the monitored events. While the example of FIG. 4 relates to college applications, the user interface 400 and implementations discussed herein may apply to evaluation of other situations and data files.

The execution graph 410 includes group nodes that correspond to decision entities, such as decision tables, decision trees, rulesets, and/or scorecards, of the executed decision logic. The execution graph 410 may show which decision entities were used to arrive at a particular decision and the order in which they were executed. Various templates of graphical illustrations of different decision entities may be stored in repository 140 and may be accessed to generate the execution graph.

As shown FIG. 4, the execution graph 410 includes group nodes 414, 416, and 418 that are invoked by a decision flow 412. The decision flow 412 may include the decision logic for a given input record. In the example of FIG. 4, the decision flow 412 is a college application processing flow that invokes the group node 414 that evaluates the input file (e.g., a student file) using an initial criteria (e.g., GPA, SAT score, etc.). The group node 414 comprises three rule nodes that are executed in order as part of the group node 414 execution and evaluation of the selected student. The group node 416 may execute rules that evaluate additional criteria (e.g., community service, extracurricular activities, strength of school, etc.). After the execution of the rules in group nodes 414 and 416, the rules engine may execute group 418 which determines the final eligibility for the student (e.g., approved for admission or denied).

While the group nodes 414, 416, and 418 show 3 rule nodes, 1 rule node, and 2 rule nodes, respectively, more or fewer rule nodes are possible. Additionally, rulesets associated with the group nodes 414, 416, and 418 may include more rules than the rule nodes shown in FIG. 4. For example, the rule nodes shown in the execution graph 410 may be based on the particular execution/decision flow. The rule nodes shown may correspond to only the rules of the ruleset that were executed for the particular execution/decision flow and the rules not executed may be omitted from the execution graph 410.

Any of the group nodes and/or rule nodes in the execution graph 410 may be selected by the user in any order to obtain more information about their corresponding decision entities. This graphical presentation of the decision logic and results of a decision entity may beneficially allow users to move forward or backward through decision logic using these group and rule nodes to deconstruct the logic used in making a certain decision.

Some group nodes, such as group node 414, may include of one or more rule nodes. Each rule node of the execution graph 410 may correspond to a single rule executed by the decision management platform 110. Rule nodes within a group node may also be accessed freely in any order to move forward or backward through decision logic. Rule nodes can be selected in the execution graph 410 to get specific information about those rules in the rule details portion 420. The rule information may include rule logical conditions, value thresholds, and participating variables. The rule details portion 420 may also show the actions taken as a result of fulfillment of these logical conditions.

On selecting a group node in the execution graph 410, the user interface 400 displays a list of variables and their values, changed by the decision logic in the corresponding decision entity in the result state portion 430. Similarly, on selecting an individual rule node, the user interface 400 may display the variables modified by the rule in the result state portion 430. In this way users can observe how the decision logic is affecting variables, and by navigating forward or backward those changes can be analyzed from different stages of execution.

Additionally, users may select values in the result state portion 430 in order to see which rule in the execution graph 410 led to the selected result. This ability to select a value and trace back through the decision logic to the decision entity that set the value offers functionality that was not achievable by conventional user interfaces. Selection of a value in the result state portion 430 may also populate information in the rule details portion 420 related to the rule or decision entity associated with the selected value.

In the example of FIG. 4, the "admissionStatus" value "Approved" 432 has been selected and, in response to the selection of the value, the rule node 419 of the group node 418 in the execution graph 410 has been highlighted. Additionally, rule details portion 420 populates with information relating to rule node 419. As shown, the rule details portion 420 includes a rule name field 422, a ruleset name field 424, a rule condition field 426, and a rule action field 428. These field provide the user with specific variables, logical conditions, variable values, variable thresholds, outputs, and/or the like associated with the selected rule node 419. This information may be helpful when debugging to see if any values, conditions, constraints, and/or the like may need editing. The information and/or fields in the rule details portion 420 may change based on the group node and/or rule node selected.

A key aspect of this interactive method is that it enables two different forms of debugging. For a given decision and/or rule, users can navigate through the decision entities and see how they are affecting different variables in the decision logic. Conversely, this system can be used in the reverse direction whereby users can focus on a variable and find which decision entities and rules were involved in modifying that variable.

The user interface 400 may also include a playback control for navigating through the decision entities and/or execution graph. The playback control may include a forward direction control and a reverse direction control for navigating the plurality of nodes in an order of execution or in a reverse order of execution. Additionally, the playback control may include an "Auto-Play" mode that automatically selects and highlights the various decision entities and individual rules in the order of execution. The user interface may display, as the auto-play mode progresses through each of the nodes of the execution graph, each rule associated with a currently selected node of the plurality of nodes. For example, the rule details portion 420 and/or a result state portion 430 may display the rule and rule information of the currently selected node. The Auto-Play mode along with the corresponding display of information may show the overall flow of decision logic and how variables are affected during their execution, thereby stepping the user through the entire decision making process for a particular decision. The user may then be able to see at what point during the flow an error and/or failure occurred.

Figure 5:
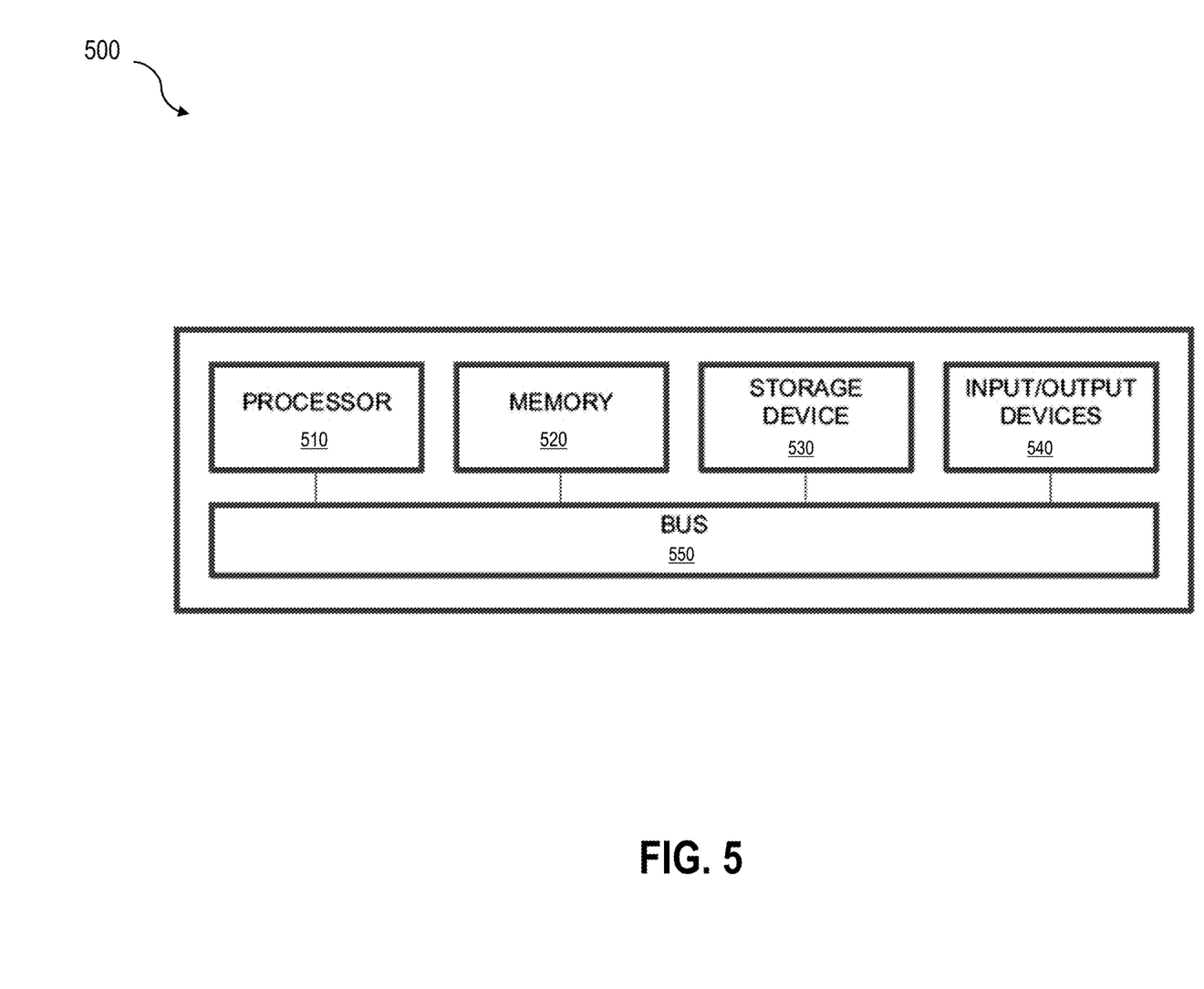
FIG. 5 depicts a block diagram illustrating a computing apparatus, in accordance with some example implementations.

FIG. 5 depicts a block diagram illustrating a computing apparatus 500 consistent with implementations of the current subject matter. Referring to FIGS. 1-4 and 6, the computing apparatus 500 may be used to implement at least a portion of the decision management platform 110, the client 130, and/or any components therein.

As shown in FIG. 5, the computing apparatus 500 may include a processor 510, a memory 520, a storage device 530, and input/output devices 540. The processor 510, the memory 520, the storage device 530, and the input/output devices 540 may be interconnected via a system bus 550. The processor 510 is capable of processing instructions for execution within the computing apparatus 500. Such executed instructions may be implement by one or more components of, for example, the decision management platform 110. In some example implementations, the processor 510 may be a single-threaded processor. Alternately, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing apparatus 500. The memory 520 may store data structures representing configuration object databases, for example. In some aspects, the memory 520 may include a cache memory and/or a main memory. The storage device 530 is capable of providing persistent storage for the computing apparatus 500. The storage device 530 may be a hard disk device, an optical disk device, or a tape device, or other suitable persistent storage means. The input/output device 540 provides input/output operations for the computing apparatus 500. In some example implementations, the input/output device 540 includes a keyboard and/or pointing device. In various implementations, the input/output device 540 includes a display unit for displaying graphical user interfaces.

According to some example implementations, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet). The input/output device 540 may include one or more antennas for communication over the network 120 with the decision management platform 110, client 130, and/or the repository 140.

In some example implementations, the computing apparatus 500 may be used to execute various interactive computer software applications that may be used for organization, analysis and/or storage of data in various formats. Alternatively, the computing apparatus 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 540. The user interface may be generated and presented to a user by the computing apparatus 500 (e.g., on a computer screen monitor, etc.).

Figure 6:
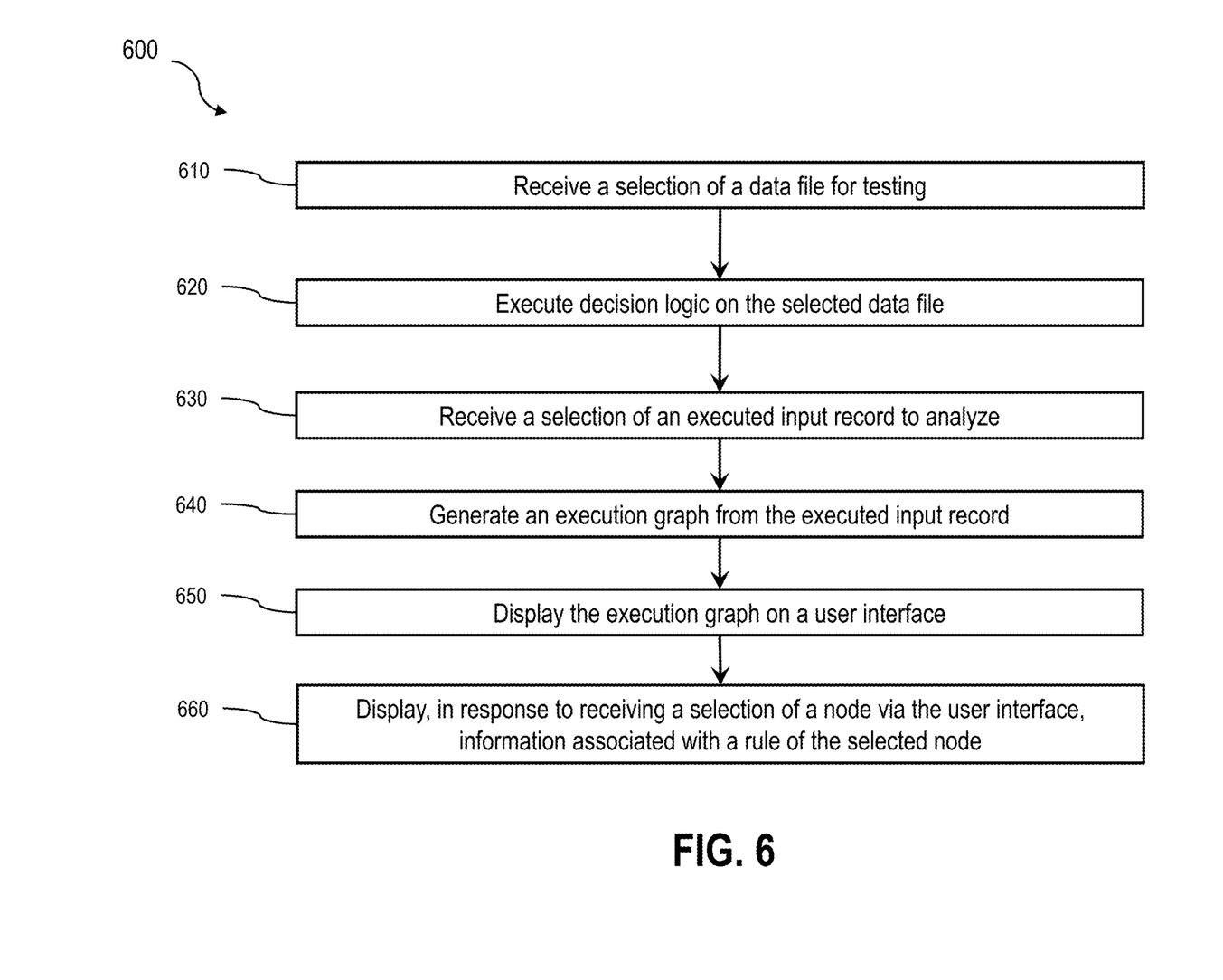
FIG. 6 depicts a flowchart illustrating a process for analyzing and navigating decision logic, in accordance with some example implementations.

FIG. 6 depicts a flowchart illustrating a process 600 for analyzing and navigating decision logic, in accordance with some example embodiments. Referring to FIGS. 1-5, the process 600 may be performed by a computing apparatus such as, the decision management platform 110, the client 130, and/or the computing apparatus 500.

At operational block 610, the computing apparatus 500, for example, may receive a selection of a data file for testing. The data file may include one or more input records storing records/information. For example, the data file and/or input record may include one or more student application records (i.e., input records) stored in one or more tables, spreadsheets, databases, vectors, and/or the like. At operational block 620, the computing apparatus 500, for example, may execute decision logic on the selected data file. In some aspects, a rules engine of the decision management platform 110 may execute the decision logic. Executing the decision logic may include applying or invoking rules to the selected data file. At operational block 630, the computing apparatus 500, for example, may receive a selection of an executed input record to analyze. For example, the decision management platform 110 may generate an output file in response to executing the decision logic. The output file may include one or more executed input records with results/decisions reached from executing the decision logic. A user may select one of the executed input records to analyze.

At operational block 640, the computing apparatus 500, for example, may generate an execution graph from the selected executed input record. The execution graph may include a plurality of nodes corresponding to a plurality of decision entities of the decision logic. At operational block 650, the computing apparatus 500, for example, may display the execution graph on a user interface. The display of the execution graph may allow a user to more efficiently navigate through the execution flow and review associated decision logic. At operational block 660, the computing apparatus 500, for example, may display, in response to receiving a selection of a node via the user interface, information associated with a rule of the selected node. Each node of the plurality of nodes may correspond to a rule of the decision logic and the information associated with the rule may include rule logical conditions, value thresholds, participating variables, and/or the like. One or more of the operational blocks in FIG. 6 may be optional. For example, with respect to operational block 610, the test data file may have been previously selected, hence a user would not need to select it again. In another example, with respect to operational block 620, the executed decision logic may have been run earlier and it may not be necessary to run again.

One or more aspects or features of the subject matter described herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer implemented method comprising:
    executing, by at least one processor, decision logic in response to receiving a data file;
    generating, by the at least one processor and in response to the executing, an execution graph, the execution graph comprising a plurality of nodes corresponding to a plurality of decision entities of the decision logic;
    displaying, by the at least one processor, the execution graph on a user interface;
    displaying, by the at least one processor and in response to receiving a selection of a node of the plurality of nodes via the user interface, information associated with the selected node; and
    executing, by the at least one processors, a debugging of the decision logic, the debugging including:
        presenting a first form of debugging which when selected allows a user to navigate through one or more of the plurality of decision entities of the decision logic displayed in the execution graph on the user interface, and in response to the user selecting a first decision entity in the execution graph, updating the user interface to display different variables affected by the selected first decision entity; and
        presenting a second form of debugging which when selected allows the user to select a first variable displayed on the user interface, and in response to the user selecting the first variable, updating the user interface to display decision entities and rules involved in modifying the first variable.

2. The method of claim 1, wherein the decision entity comprises a decision table, a decision tree, a ruleset, and/or a scorecard.

3. The method of claim 1, wherein the information associated with the selected node comprises a variable reference, a logical condition, a variable value, a variable threshold, and/or an output associated with the selected node.

4. The method of claim 1, further comprising displaying, via the user interface by the at least one processor, a variable and a corresponding variable value changed by the decision logic.

5. The method of claim 4, further comprising displaying, via the user interface by the at least one processor and in response to receiving a selection of the variable value, an indication of a highlighted node of the plurality of nodes associated with the selected variable value.

6. The method of claim 5, further comprising displaying, via the user interface by the at least one processor and in response to receiving a selection of the variable value, information associated with the highlighted node.

7. The method of claim 1, wherein the execution graph displays the plurality of nodes in an order of execution.

8. The method of claim 1, wherein the plurality of nodes comprises a rule node, the rule node corresponding to a rule of the decision logic.

9. The method of claim 8, wherein the execution graph further comprises a group node comprising one or more rule nodes.

10. The method of claim 1, wherein the user interface comprises a playback control, the playback control comprising a forward direction and a reverse direction for navigating the plurality of nodes in an order of execution or in a reverse order of execution.

11. The method of claim 10, wherein the playback control comprises an auto-play mode, the auto-play mode automatically selecting each node of the plurality of nodes in the order of execution.

12. The method of claim 11, further comprising displaying, in response to the automatic selecting in the auto-play mode, each rule associated with a currently selected node of the plurality of nodes.

13. A system comprising:
  at least one programmable processor; and
  a machine-readable medium storing instructions that, when executed by the at least one processor, cause the at least one programmable processor to perform operations comprising:
    executing decision logic in response to receiving a data file;
    generating, in response to the executing, an execution graph, the execution graph comprising a plurality of nodes corresponding to a plurality of decision entities of the decision logic;
    displaying the execution graph on a user interface;
    displaying, in response to receiving a selection of a node of the plurality of nodes via the user interface, information associated with the selected node; and
    executing, by the at least one processors, a debugging of the decision logic, the debugging including:
      selecting a first form of debugging to allow a user to navigate through one or more of the plurality of decision entities of the decision logic displayed in the execution graph on the user interface, and in response to the user selecting a first decision entity in the execution graph, updating the user interface to display different variables affected by the selected first decision entity; and
      selecting a second form of debugging to allow the user to select a first variable displayed on the user interface, and in response to the user selecting the first variable, updating the user interface to display decision entities and rules involved in modifying the first variable.

14. The system of claim 13, wherein the decision entity comprises a decision table, a decision tree, a ruleset, and/or a scorecard.

15. The system of claim 13, wherein the information associated with the selected node comprises a variable reference, a logical condition, a variable value, a variable threshold, and/or an output associated with the selected node.

16. The system of claim 13, further comprising displaying, via the user interface, a variable and a corresponding variable value changed by the decision logic.

17. The system of claim 16, further comprising displaying, via the user interface and in response to receiving a selection of the variable value, an indication of a highlighted node of the plurality of nodes associated with the selected variable value.

18. The system of claim 17, further comprising displaying, via the user interface and in response to receiving a selection of the variable value, information associated with the highlighted node.

19. The system of claim 13, wherein the user interface comprises a playback control, the playback control comprising a forward direction and a reverse direction for navigating the plurality of nodes in an order of execution or in a reverse order of execution.

20. A non-transitory computer program product storing instructions that, when executed by at least one programmable processor, cause at least one programmable processor to perform operations comprising:
  executing decision logic in response to receiving a data file;
  generating, in response to the executing, an execution graph, the execution graph comprising a plurality of nodes corresponding to a plurality of decision entities of the decision logic;
  displaying the execution graph on a user interface;
  displaying, in response to receiving a selection of a node of the plurality of nodes via the user interface, information associated with a rule of the selected node; and
  executing, by the at least one processors, a debugging of the decision logic, the debugging including:
    a first form of debugging which when selected allows a user to navigate through one or more of the plurality of decision entities of the decision logic displayed in the execution graph on the user interface, and in response to the user selecting a first decision entity in the execution graph, updating the user interface to display different variables affected by the selected first decision entity; and
    a second form of debugging which when selected allows the user to select a first variable displayed on the user interface, and in response to the user selecting the first variable, updating the user interface to display decision entities and rules involved in modifying the first variable.

* * * * *